3,366,641
PROCESS FOR THE MANUFACTURE OF COPPER PHTHALOCYANINE PIGMENTS

Guenther Zwahlen, Arlesheim, and Maurice Grelat, Bettingen, Switzerland, assignors to Ciba Limited, Basel, Switzerland, a Swiss company
No Drawing. Filed Aug. 12, 1964, Ser. No. 389,209
Claims priority, application Switzerland, Aug. 16, 1963, 10,172/63
1 Claim. (Cl. 260—296)

It has been known for more than thirty years that the copper phthalocyanines are very valuable pigments, but it was soon realized that they also had certain undesirable properties. For example, it was not long before it was found that normal copper phthalocyanine could exist in two completely different crystal modifications and, later, further crystal modifications were discovered. The crystal modification used almost exclusively up to about 1950, and which is normally known as the α-modification, can be obtained in a state of fine division in a relatively simple manner by dissolving the crude product obtained in the synthesis in sulfuric acid and pouring the solution into water and/or ice. Although this modification has a very high tinctorial strength and yields a pure blue tint, it has the disadvantage that it undergoes more or less rapid intra-molecular rearrangement when in contact with certain organic solvents, especially those of aromatic character, whereby it changes into the so-called β-modification. In many cases, considerable crystal growth also takes place during this process of change. Both phenomena are undesirable. The change into the β-form is accompanied with a substantial change in tint, the β-crystal form yielding a much more greenish blue than the α-form. Moreover, the crystal growth that takes place substantially reduces the tinctorial strength of the pigment. In spite of the fact that the two phenomena, namely, conversion into a different crystal form, particularly the β-form, and crystal growth, occur simultaneously, thus making it difficult to separate them, it is essential that the two phenomena be considered separately. A pigment that shows no tendency towards crystal growth but which changes to another crystal form naturally exhibits the undesirable phenomenon associated therewith, i.e. a change in the tint, even though no substantial decrease in tinctorial strength due to crystal growth is to be observed. On the other hand, a pigment that does not change its crystal form but is subject to crystal growth displays a decrease in tinctorial strength. It is thus essential to differentiate between pigments that are stable towards crystal growth and pigments that are stable towards crystal modification, that is to say, pigments that do not change their crystal modification but that may be subject to crystal growth.

Crystal growth can be determined by examination under the microscope, and crystal modification by study of the X-ray spectrum. In the latter case, the lines typical of the β-modification appear in varying degrees of intensity, depending on the proportion of pigment that has been converted.

In addition to these two undesirable phenomena, copper phthalocyanine may display a further unwanted property that has been described as "sensitivity to flocculation" i.e. the tendency of the finely divided pigment particles to agglomerate in an organic coating medium that is still relatively fluid before the coating has dried.

This agglomeration is generally reversible, that is to say, it can be dispersed by stirring and mixing the lacquer or enamel. However, if a coating that has been applied, for example, by dipping or by means of a brush, is allowed to dry slowly, the pigment particles have sufficient time to agglomerate while the coating is drying. This results in a weaker coloration than would normally be expected, due to enlargement of the pigment particles. This effect is generally less pronounced when the coating is applied by spraying. In this method of application, any flocculation that may have occurred is dispersed during the spraying operation by the vigorous mixing and atomization of the coating material, for example, a lacquer, and, in addition, the droplets lose a substantial proportion of their solvent content as a result of the spraying process. Thus, the droplets are in a concentrated state when they impinge on the surface to be colored, and the resulting high viscosity of the lacquer does not permit flocculation to take place to the same degree as in a more fluid lacquer. Furthermore, the drying time is shortened, which means that there is no time for flocculation to begin.

A test widely used to ascertain whether a pigment is non-flocculating or otherwise is to allow a coating of lacquer to dry to some extent and then to rub it with a finger. If the area that has been rubbed shows the same tinctorial strength as the unrubbed area, the pigment may be considered non-flocculating. However, if the rubbed area shows a distinct increase in depth of shade as compared with the unrubbed area, this is an indication that flocculation has set in and that the agglomerates have been dispersed at the area that has been rubbed.

Resistance to crystal modification is tested by heating a sample portion of the pigment in xylene, the length of the heating period depending on the severity of the test. The X-ray diffraction pattern determines the proportion of α-modification present. The α-modification content of a pigment must be 100% after such a test for the pigment to be considered resistant to crystal modification.

The pigment is also heated in xylene to test it for crystal growth. After heating, a drop of the pigment suspension in xylene is examined under the microscope. Any growth that may have taken place will be identified by a general enlargement of the crystals or the presence of crystals that are larger than others. The pigment under test may also be incorporated in an alkyd-melamine resin stoving enamel both before and after the treatment with xylene and the two test portions compared. If the pigment is not resistant to crystal growth there will be a distinct difference in tinctorial strength between the two test coatings, even though the resistance to crystal modification is good.

It can thus be stated that a good pigment must be
(a) resistant to crystal growth
(b) resistant to crystal modification
(c) resistant to flocculation.

The manufacture of the β-modification of copper phthalocyanine in the form of a pigment suitable for industrial use was also successfully accomplished many years ago. The β-modification is resistant to crystal growth and to crystal modification by nature, and is generally less liable to flocculate than the α-form. However, as has already been mentioned, the β-modification of copper phthalocyanine is much more greenish in tint than the α-modification. In view of this pronounced difference between the tints obtained with these two pigments, the use of the β-modification cannot be regarded as satisfactory when a pure blue of the kind obtainable with the α-modification is required.

Many attempts have been made to impart the three desirable properties mentioned above to copper phthalocyanine pigments of the α-modification. However, as has already been indicated, adequate distinction has not always been made between the two properties "resistance to crystal growth" and "resistance to crystal modification." It would seem that the general practice has been to study a pigment for crystal growth and, if none was observed, to decide, too, that the pigment was also resistant to crystal modification. Although this was, indeed, true in some instances, there are still many cases in which crystal modification does take place despite the fact that no crystal growth has been observed, and vice versa.

The present invention provides a process for the manufacture of new copper phthalocyanine that possess the three desirable properties mentioned above to a high degree and, furthermore, yield very valuable pure tints, wherein a mixture comprising phthalic acid, 4-chlorophthalic acid and pyridine-2:3-dicarboxylic acid, their salts, anhydrides, imides or nitriles, together with urea and a copper-yielding agent is heated in the presence of a molybdate.

The ratio of these three acids one to another may vary within wide limits according to requirements. Specially advantageous is the fact that the compartively expensive substituted phthalic acids or the substituted orthodicarboxylic acids have to be used in relatively small amounts, for example, up to about one third or advantageously one quarter to one eighth of the total amount of phthalic acids used. Distinct effects are sometimes observed when amounts as small as one tenth to one twentieth of the total amount of the above-mentioned substituted orthodicarboxylic acids are present in the starting mixture.

The synthesis can be carried out in a manner that is generally known, for example, by using the acids in the form of their anhydrides and heating the mixture in the presence of urea and an agent yielding copper.

The copper-yielding agents used are, for example, copper salts, for example, copper sulfate, or copper chlorides, especially cuprous chloride, or copper oxides, especially cuprous oxide. It is advantageous to use about 1 mol of the copper compound to 4 mols of the phthalic acid derivative. It is advantageous to use at least 1 part of urea to 1 part of the dicarboxylic acid or anhydride mixture, the best results being obtained when 1.5 to 2 parts of urea are used to 1 part of the dicarboxylic acid mixture. The molybdate, preferably ammonium molybdate, which serves as catalyst, is advantageously used in amounts of 0.1 to 5% by weight, based on the total weight of reactants used. If desired or required, other catalysts, for example, boric acid, may be used in addition to the molybdate.

The reaction is advantageously carried out in a high-boiling inert solvent, advantageously nitrobenzene or trichlorobenzene, or an alkylated benzene, for example, dodecylbenzene, naphthalene, methyl-naphthalene or anthracene.

The reaction is advantageously carried out at a temperature in the range between 150 and 290° C., especially at a temperature between 150 and 220° C. The reaction is generally finished in the course of a few hours. The reaction mixture is then worked up in the usual manner, that is to say, by comminuting the reaction mass and extracting it with dilute aqueous acid and water.

It should be mentioned that pyridine-2:3-dicarboxylic acid, also known as quinolinic acid (because it is directly obtainable from quinoline by oxidation) tends to decarboxylate. For this reason it is advisable to carry out the synthesis of the pigments under mild conditions.

A further attribute of the present process is that it is possible to use the small amounts of substituted orthodicarboxylic acids, for example, 4-chloro-phthalic acid and pyridine-2:3-dicarboxylic acid, that are required directly in the form in which they are synthesized, for example, in the form of aqueous pastes. In any case, it is not essential to convert them into their anhydrides before use.

It has already been proposed to manufacture copper phthalocyanines resistant to crystal modification by subjecting a mixture of phthalic acid and 4-chloro-phthalic acid to urea synthesis. Although the products obtained thereby are stable towards crystal modification, they are not stable towards flocculation; furthermore, the tint they yield is dulled somewhat and displays a greenish cast, which is undesirable. A process for manufacturing copper phthalocyanines from 2:3-pyridine-dicarboxylic acid as the only starting material has also been published. However, the fastness to light of the products obtained is poor in comparison with that of the products of the invention, and the tint obtained displays an undesirable reddish cast with increasing nitrogen content. It is also known that mixtures of these phthalocyanines obtained from pyridine dicarboxylic acid and conventional copper phthalacyanines exhibit a certain improvement in respect of resistance to crystal modification, although a distinct tendency towards crystal growth is still to be observed.

In the mixed synthesis of the present invention, it was feared that the shift to red in conjunction with the shift to green, brought about by the 4-chloro-phthalic acid, would result in dulling of the tint, since, as is known, a mixture of red and green produces brown. Contrary to expectations, however, it was found that by admixing these two components the desired tint can be obtained in a range that is highly desirable technically. The undesirable shift to green produced by one component acts as a corrective to the undesirable shift to red caused by the other component, and vice versa.

It was also feared that the inadequate light fastness of the copper phthalocyanines produced from pyridine-2:3-dicarboxylic acids would have an adverse effect on the light fastness of the products obtained from the mixture; however, this was not the case.

The ratio in which the components are used may vary within wide limits. Specially good results are obtained when at least 1 mol of 4-chloro-phthalic anhydride and at least 0.5 mol of pyridine-2:3-dicarboxylic anhydride or at least 0.5 mol of 4-chloro-phthalic anhydride and at least 1 mol of pyridine-2:3-dicarboxylic anhydride are used per 10 mols of phthalic anhydride.

It is also possible to increase substantially the proportion of 4-chloro-phthalic acid and pyridine dicarboxylic acid, for example, to 3 mols each per 10 mols of phthalic anhydride without impairing the quality of the end product. However, since these two components are much more expensive than phthalic anhydride it would not be advantageous to use large amounts of these relatively expensive components.

The process of synthesis yields the products in the $\beta$-modification, as is usual. However, they can be converted into the $\alpha$-modification in any known manner, for example, by recrystallization from sulfuric acid. Working up and conversion into a stage of fine division may be carried out in known manner.

Specially good results are obtained when the $\alpha$-modification, obtained, for example, by recrystallization from sulfuric acid, is heated in an aqueous medium in an autoclave at a temperature between 120 and 300° C. until a product is obtained which, after removal of the aqueous phase, yields an easily divisible pigment of high tinctorial strength possessing a very good texture.

The products can also be converted into preparations in which the copper phthalocyanine in a state of fine division is embedded in a carrier substance.

The following examples illustrate the invention. The parts and percentages are by weight.

EXAMPLE 1

500 parts of nitrobenzene, 37 parts of phthalic anhydride, 7.45 parts of pyridine-2:3-dicarboxylic anhydride, 18.25 parts of 4-chloro-phthalic anhydride, 95 parts of urea, 1.2 parts of ammonium molybdate and 10.1 parts of cuprous chloride were heated to 115° C. in the course of 2 hours while stirring, and the batch was then stirred for a further hour at 115 to 120° C. The temperature was then raised to 165° C. in the course of 2 hours and stirring continued at that temperature for 18 hours. The reaction was almost complete after this period. The temperature was then raised to 205° C. in the course of 2 hours and stirring continued at that temperature for 2 hours. The reaction mixture was allowed to cool and suction-filtered at 120° C., the residue being washed first with 500 parts of hot nitrobenzene and then with alcohol. The filter residue was boiled in 1000 parts of 2 N sodium hydroxide solution, the batch suction-filtered, the residue washed with water until the washings ran neutral, then suspended in 1000 parts of 2 N hydrochloric acid solution and boiled. The suspension was suction-filtered and the filter residue washed with water until the washings ran neutral and then dried. About 53 parts of phthalocyanine were obtained which were then dissolved in 500 parts of cold 100% sulfuric acid. The solution was poured on to approximately 3000 parts of ice, the precipitate was isolated by suction filtration and then washed until the washings ran neutral. The filter residue was suspended in about 1500 parts of water and the suspension stirred for 4 hours in an autoclave at 230° C. After cooling the reaction mixture, the product was isolated by suction filtration and dried in a vacuum cabinet at 80° C. A phthalocyanine pigment was obtained which had the properties of $\alpha$-copper phthalocyanine and which was also resistant to flocculation, crystal growth and crystal modification.

EXAMPLE 2

When 44.4 parts of phthalic anhydride, 7.45 parts of pyridine-2:3-dicarboxylic anhydride, 9.13 parts of 4-chlorophthalic anhydride and 95 parts of urea were reacted in 500 parts of nitrobenzene with 1.2 parts of ammonium molybdate and 10.1 parts of cuprous chloride in the manner described in Example 1, and the product obtained further processed in the manner described in that example, a phthalocyanine pigment having the same properties as the product described in Example 1 was obtained.

EXAMPLE 3

A similar result was obtained when

| | Parts |
|---|---|
| Phthalic anhydride | 48.1 |
| Pyridine-2:3-dicarboxylic anhydride | 7.45 |
| 4-chloro-phthalic anhydride | 4.56 |
| Urea | 95 |
| Ammonium molybdate | 1.2 |
| Cuprous chloride | 10.1 | in 500 parts of nitrobenzene, or

| | Parts |
|---|---|
| Phthalic anhydride | 48.1 |
| Pyridine-2:3-dicarboxylic anhydride | 3.72 |
| 4-chloro-phthalic anhydride | 9.12 |
| Urea | 95 |
| Cuprous chloride | 1.2 | in 500 parts of nitrobenzene were reacted under the conditions described in Example 1, and the products further processed in the manner therein described.

EXAMPLE 4

44.4 parts of phthalic anhydride, 8.35 parts of pyridine-2:3-dicarboxylic acid, 13 parts of the crude monosodium salt of 4-chloro-phthalic acid obtained by chlorinating phthalic anhydride in aqueous sodium hydroxide solution, and containing 85% of pure monosodium salt, 95 parts of urea and 1.2 parts of ammonium molybdate were stirred in 500 parts of nitrobenzene at 100 to 110° C., 10.1 parts of cuprous chloride were then added and stirring continued for a further 2 hours at 116° C. The temperature was raised to 165° C. in the course of 2 hours, and stirring continued at that temperature for 16 hours. The batch was cooled to 120° C., suction-filtered, the filter residue washed with hot nitrobenzene, suspended in aqueous sodium hydroxide solution, the suspension steam-distilled to remove the nitrobenzene, filtered, and the residue dried. The copper phthalocyanine thus obtained was dissolved in about 500 parts of 100% sulfuric acid, the solution was poured on to 3000 parts of ice, the precipitate isolated by suction filtration, washed until the washings ran neutral, suspended in about 1800 parts of water and stirred for 4 hours in an autoclave at a temperature of 230° C.

EXAMPLE 5

500 parts of nitrobenzene, 41.6 parts of phthalonitrile, 6.1 parts of the crude sodium salt of 4-chlorophthalic acid obtained by chlorinating phthalic anhydride in aqueous sodium hydroxide solution, and containing 84% of pure sodium salt, 25 parts of urea, 40 parts of ammonium chloride, 0.5 part of ammonium molybdate and 8.35 parts of quinolinic acid were heated to 100 to 110° C. in the course of 1 hour and the batch stirred at that temperature for 2 hours. 12 parts of cuprous chloride were then added and the temperature kept at 116° C. for 2 hours. The temperature was raised to 160° C. in the course of 2 hours and stirring was continued for 18 hours at 160 to 165° C. The batch was then heated to 205° C. in the course of 2 hours and kept at 205 to 210° C. for 1 hour. The reaction mixture was allowed to cool, filtered at 120° C. and the filter residue washed with about 500 parts of hot nitrobenzene. The filter residue was steam-distilled in the presence of 150 parts of sodium hydroxide solution and 1000 parts of water. The residue, which was free from nitrobenzene, was filtered, the filter residue washed with hot water and then dried, 53 parts of phthalocyanine were obtained which were dissolved in 500 parts of cold 100% sulfuric acid. This solution was discharged on to about 3000 parts of ice, the precipitated product was isolated by suction filtration and washed until the washings ran neutral. The filter residue was suspended in 1500 parts of water and the suspension stirred for 4 hours in an autoclave at a temperature of 230° C. After cooling the suspension, the product was isolated by suction filtration and dried in vacuo at 80° C. A copper phthalocyanine pigment was obtained which had the properties of the $\alpha$-modification and which was also resistant to flocculation, to crystal growth and to crystal modification.

EXAMPLE 6

Similar results were obtained when

| | Parts |
|---|---|
| Phthalonitrile | 41.6 |
| Monosodium salt of 4-chloro-phthalic acid (84%) | 6.1 |
| Quinolinic acid | 8.35 |
| Ammonium molybdate | 0.5 |
| Urea | 36 |
| Cuprous chloride | 12 | or

| | Parts |
|---|---|
| Phthalonitrile | 20.8 |
| Phthalic anhydride | 24.05 |
| Monosodium salt of 4-chloro-phthalic acid (84%) | 6.1 |
| Quinolinic acid | 8.35 |
| Ammonium molybdate | 0.5 |
| Ammonium chloride | 40 |
| Urea | 75 |
| Cuprous chloride | 12 | or

| | Parts |
|---|---|
| Phthalonitrile | 20.8 |
| Phthalic anhydride | 24.05 |
| Monosodium salt of 4-chloro-phthalic acid (84%) | 6.1 |
| Quinolinic acid | 8.35 |
| Urea | 108 |
| Ammonium molybdate | 0.5 |
| Cuprous chloride | 12 | or

| | Parts |
|---|---|
| Phthalimide | 47.8 |
| Monosodium salt of 4-chloro-phthalic acid (84%) | 6.1 |
| Quinolinic acid | 8.35 |
| Urea | 36 |
| Ammonium chloride | 40 |
| Ammonium molybdate | 0.5 |
| Cuprous chloride | 12 | or

| | |
|---|---|
| Phthalimide | 47.8 |
| Monosodium salt of 4-chloro-phthalic acid (84%) | 6.1 |
| Quinolinic acid | 8.35 |
| Urea | 36 |
| Ammonium molybdate | 0.5 |
| Cuprous chloride | 12 | in 500 parts of nitrobenzene were reacted under the conditions described in Example 5, and the products further treated as therein indicated.

What is claimed is:

1. A copper phthalocyanine pigment possessing a high degree of stability toward crystal growth, crystal modification of flocculation, obtained by a process wherein a mixture of a phthalic acid compound, a 4-chlorophthalic acid compound and a pyridine - 2:3 - dicarboxylic acid compound in which said compounds are respectively selected from the group consisting of phthalic acid, 4-chlorophthalic acid and pyridine-2:3-dicarboxylic acid, their salts, anhydrides and imides and their nitriles is heated at temperatures between 150 and 290° C. with urea and an agent yielding copper in the presence of a molybdate as catalyst in which process at least one mol of the copper compound is used for 4 mols of the phthalic acid derivative, and at least 0.5 mol each of the pyridine-2:3-dicarboxylic acid compound and the 4-chlorophthalic acid compound used per 10 mols of the phthalic acid compound.

References Cited

FOREIGN PATENTS 696,590   9/1940   Germany.

JAMES A. PATTEN, *Primary Examiner*.